Jan. 21, 1958 E. F. KOHL 2,820,266
SHELL MOLD STRUCTURE
Filed March 11, 1955 2 Sheets-Sheet 1
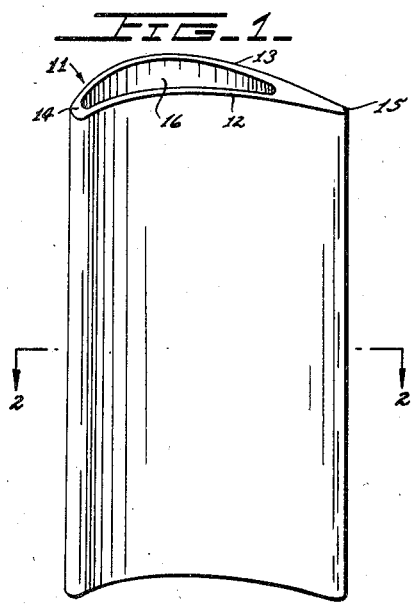
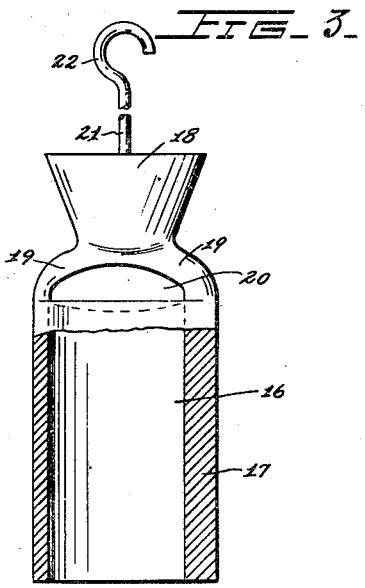
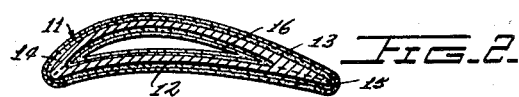
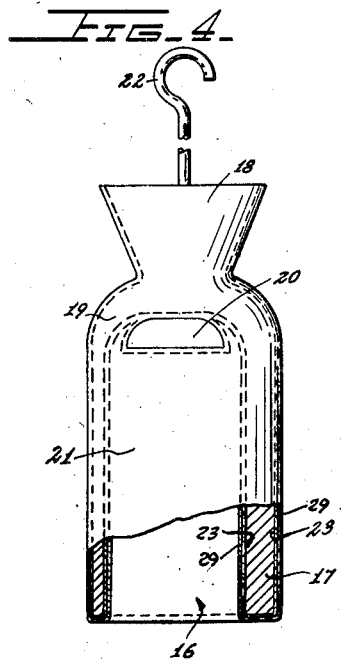
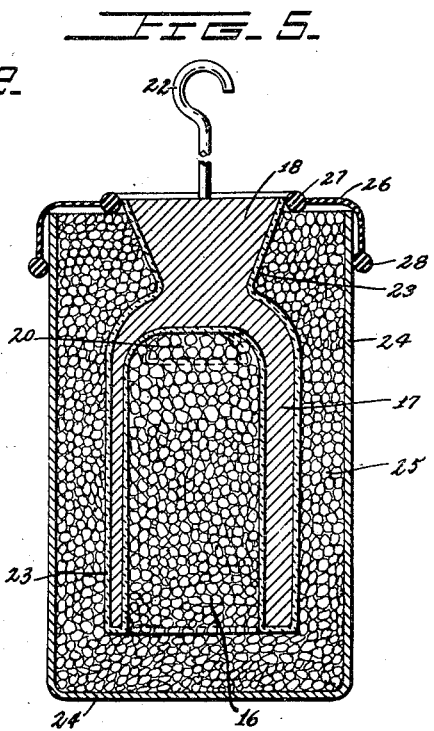

Jan. 21, 1958 E. F. KOHL 2,820,266
SHELL MOLD STRUCTURE
Filed March 11, 1955 2 Sheets-Sheet 2
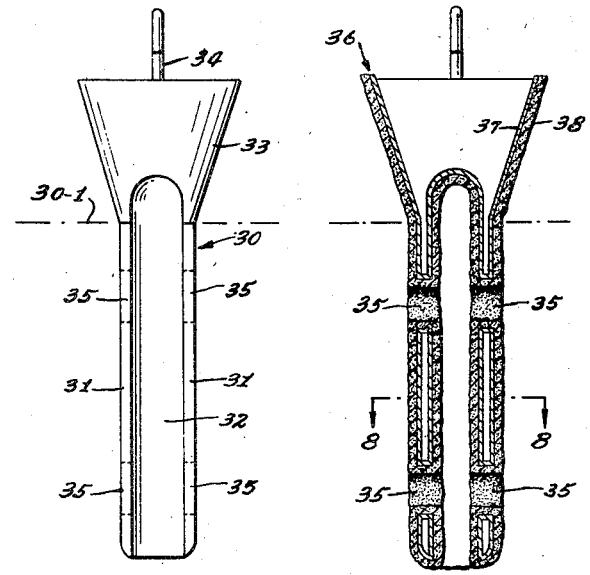
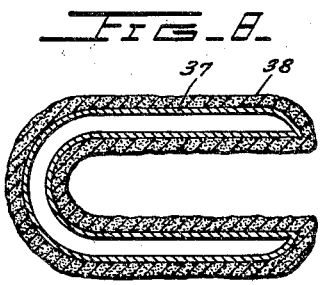
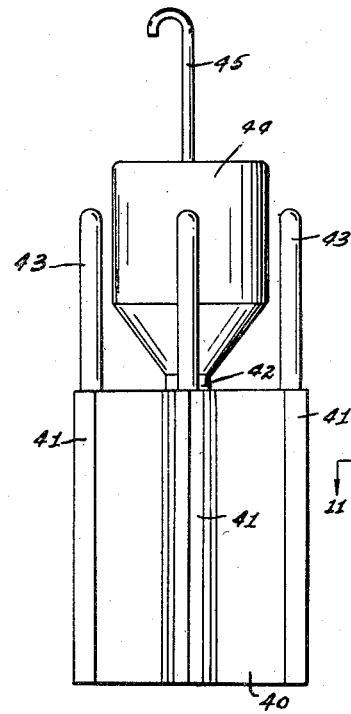
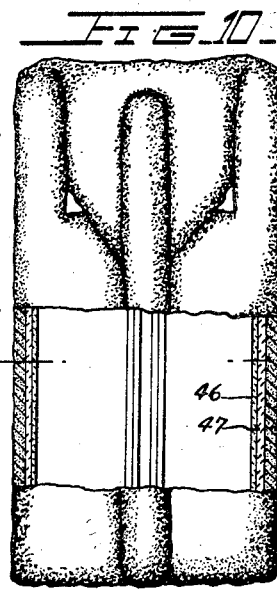
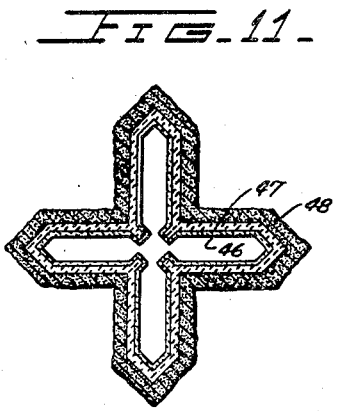

United States Patent Office 2,820,266
Patented Jan. 21, 1958

2,820,266

SHELL MOLD STRUCTURE

Everard F. Kohl, Lakewood, Ohio

Application March 11, 1955, Serial No. 493,677

2 Claims. (Cl. 22—129)

This application is a continuation-in-part of my application Serial No. 192,002, filed October 25, 1950, now abandoned as a continuation-in-part of my application Serial No. 7,953, filed February 12, 1948, now abandoned.

This invention relates to processes of preparing shell mold structures by means of frozen mercury patterns defining the cavity into which objects are to be cast, to mold structures produced by such processes, and to compositions utilized in preparing such mold structures.

As a result of past efforts, there has been developed a commercial method of preparing precision castings by molds made with what is known as the "lost-wax" method. However, the "lost-wax" method of precision casting has many serious limitations. With the "lost-wax" method it is impossible to produce thin-walled porous shell molds with mold cavities of fine surface finish for use in casting metal parts having intricate shape. Because of the relatively great expansion coefficient of wax-like or plastic patterns, molds formed over such patterns must be of relatively great thickness to resist the large expansion forces of such pattern when the mold and pattern are heated to melting or burning-out temperature of the pattern for removing the pattern from the mold cavity. In addition it is impossible to produce with patterns of wax-like or plastic materials molds for use in casting large-size parts, because the large wax patterns tend to sag. Furthermore, if a pattern of wax-like or plastic material is used for preparing a mold for a large-size casting, the volumetric change caused by the expansion of the wax or plastic pattern material is so great that large stresses are imparted in the thick-walled mold, causing the mold to crack.

Prior to the invention it was practically impossible to produce metal castings having thin cast metal walls spaced from each other by a hollow space, such as hollow gas turbine vanes, hollow gas turbine buckets, hollow rifle receiver bodies and other like metal castings. Thus, when hot metal is cast into a mold cavity having the shape of the desired thin hollow metal body, the molten metal will, upon solidifying, contract about the mold core and develop large forces. Prior to the invention, the forces developed by the contracting solidifying molten metal poured into such mold cavity of prior art thick molds resulted in most cases in cracking of the casting.

Among the objects of the present invention are casting molds which enable casting of thin hollow metal bodies under the elimination of the difficulties heretofore encountered with prior art molds when making such castings.

In accordance with the invention, the difficulties encountered in the past with casting of thin hollow metal bodies are overcome by providing novel thin shell molds, the core of which has shell walls thin enough to yield under the strain of the contracting cast molten metal solidifying around them while being thick enough to resist the impact of the hot molten metal cast into the mold cavity.

The foregoing and other objects of the invention will be best understood from the following description of exemplifications thereof, reference being had to the accompanying drawings, wherein Fig. 1 is an isometric view of a nozzle vane of a gas turbine which is to be cast with a shell mold of the invention;

Fig. 2 is a cross-sectional view of a frozen mercury casting pattern of the vane, with the shell mold of the invention formed thereon;

Fig. 3 is an elevational view with parts in section of the frozen mercury pattern of Fig. 2;

Fig. 4 is a view similar to Fig. 3 with a shell mold of the invention formed on the casting pattern;

Fig. 5 is a cross-sectional view of the same casting pattern with another type of shell mold formed thereon held in a casting flask by loose refractory particles;

Fig. 6 is a side elevational view of a frozen mercury casting pattern on which is formed a mold for the receiver body of a rifle;

Fig. 7 is a sectional view of the casting pattern of Fig. 6 with a shell mold of the invention formed thereon;

Fig. 8 is an enlarged sectional view along lines 8—8 of Fig. 7.

Fig. 9 is an elevational view of another casting pattern of an object to be cast;

Fig. 10 is a view similar to Fig. 9 of a shell mold of the invention formed over the casting pattern of Fig. 9 with parts in section; and Fig. 11 is a cross-sectional view along line 11—11 of Fig. 10.

Referring to Figs. 1 through 4, there will now be described the phase of the invention wherein one form of a thin-walled shell mold is formed on a complex frozen mercury pattern. Figs. 1 and 2 indicate, by way of example, a gas turbine vane 11 having a hollow interior 16 and which is to be cast in accordance with the invention. The vane 11 has an air-foil contour with a generally concave thin blade section 12 and a generally convex thin blade section 13 joined along the front edge region 14 and rear edge region 15. The vane 11 may also have an axial twist along its length.

If a frozen mercury pattern of such a turbine vane is difficult to produce from a single permanent master mold, it may be produced by making separate frozen mercury patterns of sections 12 and 13 in separate partible permanent molds. The separate sectional mercury patterns 12 and 13 may then be joined or welded at mating surfaces indicated by dashed lines in Fig. 2 to form a single, continuous integral frozen mercury pattern. The several pattern sections may be provided along their mating surfaces with suitable interfitting male and female aligning elements to facilitate ready alignment of the several pattern sections into the desired complex pattern. Such individual frozen mercury pattern sections, when brought into abutment along their mating surfaces, will become united and welded into the self supporting complex frozen mercury pattern of the desired object which would be difficult to produce with a single permanent master mold.

Such gas turbine vanes are made of alloy metal having high hot strength and corresponding high melting temperature. When such alloy metal is cast into the mold cavity, it will, upon solidifying, contract about the core portion of the mold which gives shape to the hollow interior of the vane. The molds for casting such parts must have mold walls which are thin enough to yield, as otherwise the thin walls of the casting may be subjected to cracks as the molten metal cools and tends to contract about the unyielding core portions of the mold structure. By making the mold structure with thin shell walls which yield when subjected to the contracting forces of the solidifying molten metal, these difficulties are avoided.

Fig. 3 shows a cross section of the frozen mercury pattern 17 of vane 11 with a sprue 18 of frozen mercury attached thereto by means of frozen mercury arms 19 which bridge the narrow border regions of the vaneshaped frozen mercury pattern. This bridge arrangement provides passages to the inner surfaces of the hollow frozen mercury pattern 17 facing the hollow interior 16, which inner pattern surfaces are to be coated with the shell-forming coating compositions. A strong rigid metal hook 22 having a shank which is frozen in the sprue gate portion 18 of the frozen mercury pattern, is utilized in manipulating the frozen mercury pattern while coating it with the shell mold forming compositions. Frozen mercury in the pure state is especially suitable for practicing the invention, although it is not limited thereto as long as the impurities do not affect the physical properties of mercury which render it suitable for practicing the invention.

The frozen mercury pattern 17 is now ready for coating with the mold forming composition. This is accomplished by repeatedly immersing the frozen mercury pattern in, or pouring over its surface a slurry of the coating composition while the pattern and the slurry are maintained at a temperature below the freezing point of mercury. The coating slurry comprises a liquid carrier, fine particles of refractory material, a raised temperature binder for the refractory particles which is ineffective at the freezing temperature of mercury but which becomes effective as a binder for the refractory particles at raised temperatures and an organic resinous binder that has the physical property of being adherent to the frozen mercury pattern at temperatures below the freezing point of the pattern and which is effective as a binder for the refractory particles and the raised temperature binder at temperatures from below the freezing point of mercury up to the raised temperature at which the raised temperature binder becomes effective as a binder for the refractory particles and of causing the bound particles to adhere to the frozen mercury pattern at such very low temperatures. The raised temperature binder is so chosen that it becomes effective as a binder for the refractory particles at raised temperatures below that at which the resinous binder ceases to have the required properties of holding the refractory particles bound in the desired shell mold. The liquid carrier is chosen to have a low boiling point and to volatilize in a short period of time at temperatures from below the freezing temperature of mercury, i. e. below −40° C. up to about normal temperatures, such as up to 0° C.

The viscosity of the refractory slurry depends upon the size and complexity of the frozen mercury pattern to be coated. For example, the slurry must be thin enough to readily penetrate all narrow openings or slits and all narrow corners. Between each successive coating, by immersion or dipping of the pattern in the slurry, or by spraying the slurry on the pattern, a period of time is allowed to at least partially dry the applied coating stratum or film. The successive coating and drying operations are carried on until a shell layer of the desired thickness has been formed around the surfaces of the frozen mercury pattern. After applying the last coating stratum, the shell layer or mold is dried.

Both the coating and drying of each shell layer stratum should be carried on in an atmosphere refrigerated to well below the freezing point of the mercury pattern material. In particular, the drying of the shell mold layer should be effected at temperatures below the boiling point of the carrier so as to provide a smooth film or shell layer. The drying may be expedited by circulating through the drying space where intermittent drying takes place and atmosphere of air refrigerated to below the freezing temperature of the mercury pattern material and below the boiling point of the carrier. The vapor of the liquid carrier absorbed into the refrigerated atmosphere may be recovered by conventional compression techniques or the like, whereby the liquid carrier may be used again to form the coating composition. The continuous circulation of the refrigerated atmosphere from which the carrier vapors have been removed, also reduces the vapor pressure of the liquid carrier, thereby expediting the volatilization of the liquid carrier from the coating layers. A suitable degree of vacuum may be applied to the drying space for expediting the volatilization of the carrier.

Figs. 2 and 4 show a substantially self-supporting mold structure with thin shell walls consisting of the shell layers formed in accordance with the invention over the frozen mercury pattern of the vane of Fig. 3. The thin shell mold generally designated 21 (Fig. 4) has an inner thin shell layer 23 and an overlaying supporting or backing shell layer 29 forming with the inner shell layer 23 a self-supporting shell mold structure from which the frozen mercury pattern 17 may be readily removed, as by heating to above the melting point of mercury and pouring it out of the mold cavity. The two layer shell mold 21 so formed is sufficiently thin to yield when molten metal cast into the mold cavity contracts about parts of the shell mold such as the inner hollow shell core of the shell mold 21, thereby preventing formation of cracks in the casting. When the frozen mercury pattern of the object to be cast is comparatively thin, as in the case of the thin wall gas turbine vane, the walls of the shell mold of the type shown in Fig. 4 may have an overall thickness from about $\frac{1}{16}$ to about $\frac{3}{16}$ inch.

Referring to Fig. 2, the inner shell layer 23 is first formed over the exposed surfaces of the frozen mercury pattern 17 by applying thereto several strata of the slurry-like shell-forming coating composition below the freezing temperature of mercury, each coating stratum being at least partially dried before applying thereover the next stratum of the coating composition in the manner explained hereinabove.

After partially drying the exterior stratum of the inner shell layer 23 below the freezing temperature of mercury, the outer supporting backing shell layer 29 is formed thereover with a modified shell-forming coating composition having characteristics similar to that used for forming the inner shell layer 23. In order to give the outer backing shell layer 29 relatively great strength, the refractory particle material of the backing layer coating composition is chosen so that it contains partly coarse size particles and partly fine size particles. Such double shell layer mold may be made with a very thin inner shell layer of fine refractory particles, the outer backing shell layer 29 with its coarser refractory particles providing the required strength, while the combined overall thickness of the two shell layers 23, 29 is small enough to permit wall portions of the shell mold to yield when the molten metal which is cast into the mold solidifies and contracts about the core portions of the mold which it partially or wholly surrounds. By way of example, for cast objects of the type described such as the gas turbine vanes or gas turbine buckets, good results are obtained with the inner shell layer 23 made with a wall thickness of about $\frac{1}{64}$ to $\frac{1}{32}$ inch, and the overall thickness of the two shell layers 23, 29, about $\frac{1}{16}$ to $\frac{3}{16}$ or $\frac{1}{4}$ inch.

According to a phase of the invention, explained in connection with Fig. 5, frozen mercury patterns may also be used to form thereon thin single-layer shell molds, the walls of which are backed in a special way by a mass of relatively loose refractory particles. Fig. 5 shows the same frozen mercury pattern 17 of the hollow vane, Fig. 3, having formed thereon only a single-layer shell mold 23 corresponding to the inner shell layer 23 of the two-layer mold of Figs. 2, 4. The thin shell mold 23 of Fig. 5 is formed over the frozen mercury pattern 17 in the same way as the inner shell layer 23 of the two-layer shell mold 21 shown in Figs. 2, 4. The walls of the thin shell mold 23 of Fig. 5 are made sufficiently thin to yield when molten metal contracts about parts of the shell mold in cooling, thus preventing damage to the casting and cracking thereof. In case of frozen mercury patterns for thin castings, such as the vane of Figs. 1, 2, the walls of the shell mold 23 may have an overall thickness from about 1/32 to about 1/8 inch. This phase of the invention constitutes the subject matter of application Ser. No. 192,001, filed October 25, 1950, now Patent No. 2,682,692 and need not be more fully explained herein.

After forming on the frozen mercury pattern the thin shell mold 21 (Fig. 4) and drying the applied coating composition layers by evaporating or driving off the liquid carrier, the mercury of the pattern is liquefied and removed, as by pouring from the cavity of the self-supporting shell mold. The frozen mercury may also be melted by bringing liquid mercury into contact with the mercury in the mold cavity. Another and effective method of liquefying the frozen mercury pattern is to place or pass the shell mold containing the frozen mercury pattern through a high-frequency induction field.

After the mercury pattern has been liquefied, the mercury is poured from the shell mold by inverting the flask. The frozen mercury pattern may also be provided with a narrow sprue outlet portion at its bottom, in which case the liquid mercury may be drained from the bottom of the mold. The small aperture remaining in the bottom portion of the mold may be plugged with refractory material prior to casting the molten metal into the mold cavity.

To harden the shell mold 21 and render it resistant to molten metal having a high melting point, the flask 24 with the shell mold 23 and backing mass 25 held therein is now heated in a furnace to a sufficiently high temperature to cause the raised temperature binder to become effective as a binder for the refractory particles in the shell mold and to modify the organic resinous binder as by driving it off, or vaporizing it, to thereby impart porosity to the shell mold. The baking or firing temperature, which may be up to 1250° C., as well as the time required for baking depend upon several factors such as the size and thickness of the shell mold, the temperature of the molten metal to be cast, and the hardness of the mold surface required. Good results are obtained with a baking temperature of red heat or about 1000° C.

When the shell mold has been properly hardened, the mold is removed from the furnace and the mold is ready for casting. When high melting temperature metal is to be cast, or where thin sections are involved, the metal is cast into the shell mold while the mold is still hot. In casting metal having a low fusion point, it is also desirable to cast the metal into a hot mold in order to prevent solidification of the metal before it completely fills the mold.

After the cast metal has been cooled and solidified, the casting may be retrieved by removing the thin shell mold from the casting. A large portion of the shell mold may be easily broken away from the casting and the remainder of the refractory mold may be removed by blasting, such as with sand. Figs. 7 and 8 show a thin two-layer shell mold of the receiver part of a rifle, indicated below the dash-dot line 30—1. Such rifle receiver has very thin side walls, only one thirty-second (1/32) of an inch thick, and the inner surface has special guide ways, which heretofore had to be produced by accurate machining operations. The frozen mercury pattern 30 has a gate portion 33 forming a pattern for the mold gate into which the shank of a rigid metal hook 34 is embedded during the freezing of the mercury. Each of the two side walls 31 of the pattern has two spaced openings 35.

Figs. 7 and 8 show the shell mold 36 of the invention which has an inner thin shell layer 37 and an outer supporting shell layer 38 which were formed on the surfaces of the frozen mercury pattern shown in Fig. 6, including its aligned openings 35 in the manner explained in connection with Figs. 2, 4. The inner shell layer 37 is made very thin, and the outer shell layer 38 provides the required strength, while the combined thickness of the two shell layers 37 and 38 is small enough to permit wall portions of the shell mold to yield when molten metal cast into the mold cools and contracts about portions of the mold which it surrounds. By way of example, for cast objects which are similar to the pattern shown in Fig. 6, having a wall thickness of about 1/16 to 1/4 inch, the inner shell layer may have a thickness of 1/64 to 1/16 of an inch, and the overall thickness of the two shell layers 37 and 38 of the completed shell mold may be 1/16 to 1/4 of an inch thick.

As the thickness of the frozen mercury pattern of the object to be cast is increased, the thickness of the shell layer must also be increased to provide upon the liquefaction and removal of the mercury a shell mold of sufficient thickness to resist the impact of the molten metal cast into the shell mold which in such case will be larger in amount than when a thin casting cavity is provided. When the thickness of the frozen mercury pattern is large, it is not necessary, however, to increase the thickness of the applied shell layer, or shell layers, in the same ratio as the thickness of the pattern is increased because in such cases only a slight increase in the thickness of the shell layer, or combined shell layers, will provide ample strength in the finally formed shell mold. Even when the pattern of the object to be cast is comparatively large, it is not necessary to provide a shell mold having an average thickness greater than approximately 1/4 to 3/8 of an inch because shell molds having such thickness will resist the impact of a large amount of molten metal cast into the shell mold and will be thin enough to yield when metal which is cast into the cavity of the shell mold contracts about portions of the shell mold during cooling. When a shell mold having an average thickness of 1/4 to 3/8 of an inch is provided, the average thickness of the inner shell layer may vary from approximately 1/32 to 1/16 of an inch in thickness.

When molten metal of high temperature is cast into the mold cavity, such as shown in Figs. 7 and 8, to form concave or hollow metal articles, the molten metal contracts upon cooling about portions of the shell mold which it partly or wholly surrounds and these shell mold portions must be thin enough to yield to prevent the formation of cracks in the casting. The solidifying cast molten metal also contracts about convex portions of the shell mold which define the concave inner surfaces of the cast metal article, such as shown in Fig. 8, and these convex mold portions must also be thin enough to yield to prevent formation of cracks in the thin casting portions. The portion of the shell mold structure where the highest contraction of the cast metal takes place, such as the slot sections 35 of Figs. 7, 8, may be made in the form of a thin single shell layer, while other portions of the mold may consist of two shell layers, suitable masks or removable blocking elements being applied to the slot sections 35 when the second shell layer is formed on other parts. The outer shell layer is formed of a coating composition similar to that used in making the inner layer, except that the refractory material consists partly of fine particle size and partly of coarse particle size.

In cases requiring still larger self-supporting mold structures, the shell molds of the invention may be made out of three shell layers, as shown by way of example in Figs. 9, 10 and 11. A frozen mercury pattern 40 (Fig. 9) of the object to be cast has four wings 41 extending from a central body part 42. The several elements of the structure are of relative intricate designs. The four wings 41 of the pattern have upward extensions 43, serving as mold sprues. A central sprue portion 44 forms the pattern for the mold gate. A metal hook 45 is frozen into the mercury pattern for handling it.

Figs. 10 and 11 show a three-layer shell mold formed with the frozen mercury pattern of Fig. 9. It comprises a thin inner shell layer 46, a thin intermediate buffer layer 47, and an outer shell layer 48. The buffer layer 47 is formed of relative movable or loose refractory particles which while resisting lateral displacement of the inner shell layer 46 permits it to yield slightly when hot molten metal is cast into the shell mold. The inner shell layer 46 is of sufficient thickness to permit it to yield when cast molten metal contracts on cooling about mold portions or about cores or mold inserts. The outer shell layer 48 serves as a backing support for the inner and buffer shell layers 46, 47 and prevents lateral displacement of the inner shell layer portions 46 under the impact of cast molten metal.

The thickness of the inner shell layer 46 may vary in thickness from about 1/50 to 1/20 of an inch. The outer shell layer may be of sufficient thickness to provide an overall mold thickness of about 1/8 to 3/8 of an inch. In general, the overall thickness of the shell mold structure, whether consisting of two or three shell layers, need not be greater than about 1/8 to 3/8 of an inch.

The shell-forming investment coating compositions which are used to prepare the inner shell layer comprise refractory particles constituting a predominant amount of the solid ingredients of the composition, a raised temperature binder that is ineffective as a binder for the refractory particles at the freezing temperature of mercury but which becomes effective at a raised temperature and which after becoming effective binds the refractory particles together up to the casting temperatures, and an organic resinous binder having the properties of being adherent to a frozen mercury pattern at temperatures below the freezing point of the pattern and being coherent to previously applied layers or films of the same or a similar composition at temperatures below the freezing point of mercury. The organic resinous binder must also be capable of binding the refractory particles and the raised temperature binder together at temperatures from below the freezing point of mercury up to the raised temperature at which the raised temperature binder become effective in binding the refractory particles. It is also desirable that the organic resinous binder shall have the property of becoming modified on heating, as by decomposition or vaporization, to provide vapors which exude through the shell walls and render them porous. In practice, this is achieved by baking the shell mold at a raised temperature, usually about 1000° C., for causing the raised temperature binder to become effective as a binder for the refractory particles. However, it is not essential that the raised temperature binder shall form part of the coating composition because after the mercury has been liquefied and removed from the mold cavity, the shell mold may be impregnated with a binder that becomes effective as a binder for the refractory particles at raised temperatures.

To enable the composition to be applied in the form of a slurry to the frozen mercury pattern, there is provided a liquid carrier for the solid composition ingredients. The carrier must remain liquid at least at temperatures as low as the frozen mercury pattern and must have a boiling point below normal temperatures so that it will volatilize in a short period of time at temperatures below the freezing point of the pattern.

Any suitable refractory material that may be formed into fine particles and which is resistant to high temperatures may be used in shell-forming coating compositions for preparing the shell molds of the invention. Among desirable refractory materials are zirconium silicate and unstabilized and stabilized zirconia (zirconium oxide). Also beryllium oxide, aluminum oxide and silicon oxide, also silica, chromite, magnesium oxide, aluminum silicate, such as sillimanite or mullite, alumina, ground quartz, flint, silicon carbide. Also, a mixture of two or more of such materials, or a mixture of magnesium oxide and calcium oxide. As an example, in commercial practice, very good results are obtained by using zirconium silicate as the refractory particle material. Good results are obtained with the refractory particles forming about 85% to 95% or more of the normally solid ingredients of the composition.

In the investment coating composition for forming the inner shell layer 23, 37 or 46 of a shell mold structure consisting of two or more shell layers, such as shown in Figs. 4, 7 and 10, or a thin single layer shell mold, such as shown at 23 in Fig. 5, the refractory particles should be sufficiently fine to provide a smooth hard mold cavity surface so as to yield a metal casting having a smooth surface. In practice, excellent results are obtained with refractory particles of —325 mesh particle size. In general, particles of an average size from minus 60 mesh to minus 1000 mesh are suitable. A comparatively smooth mold surface will be obtained with the refractory particles minus 150 mesh to about minus 350 mesh in size. Extremely fine refractory materials are less desirable as the resulting shell mold is of lesser porosity. When extremely fine particles are usde, it is desirable to mix them with 80 to 90% coarser particles.

The low temperature binder for the refractory particles of the investment composition must be effective as a binder at temperatures from very low temperatures below the freezing temperature of the frozen mercury pattern up to at least normal temperatures and must have the physical properties of being adherent to a frozen mercury pattern and coherent to additional layers or films of the same or an equivalent composition at said very low temperatures. Certain synthetic organic resinous compounds meet these requirements.

Very good results are obtained with investment compositions containing as low temperature binder a mixture of polyvinyl acetate and ethyl cellulose. Ethyl cellulose that has been ethylated to a material extent, such as to an extent of 46.5% or more, for example 49%, is particularly effective in such binder mixture. In general, the resinous binder may consist of from about 3 to 6 parts of polymerized vinyl acetate and 1 part of ethyl cellulose to from 3 to 6 parts of ethyl cellulose and 1 part of polymerized vinyl acetate. Investment compositions in which the polymerized vinyl acetate and ethyl cellulose are present in equal proportions are satisfactory. It has been found to be desirable, however, and particularly when the investment composition is applied to the frozen mercury pattern by dipping it, to have an excess of the polymerized vinyl acetate, such as 3 to 6 parts thereof and 1 part ethyl cellulose. (Throughout the specification and claims all proportions are given by weight unless otherwise specifically indicated in each specific instance.)

The amount of such resinous binder that is present in the investment coating composition may vary from about .25 to 7% of the solid ingredients of the investment composition remaining therein after evaporation of the liquid carrier. Good results are obtained with the low temperature binder forming from approximately .5% to 2% of the solid investment ingredients.

It is also desirable to embody in the investment coating composition a thermosetting resinous material, such as a coumarone-indene resin or a phenol-formaldehyde condensation product in its intermediate soluble stage, in an amount ranging from .25% to 3% of the solid investment ingredients.

The shell-forming slurry-like coating composition to be applied to the frozen mercury pattern also contains a liquid carrier which is capable of holding the refractory particles, the raised temperature binder and the organic resinous binder in a dispersed state or in colloidal solution, at least, if the liquid is stirred or otherwise agitated. It is desirable to provide the resinous binder in the form of small particles so that the resinous binder particles may be held uniformly dispersed or in colloidal solution in the liquid carrier and to have a carrier, which at least partially dissolves the phenol-formaldehyde condensation product. The liquid carrier should be present in an amount sufficient to provide with the normally solid ingredients of the composition a slurry of sufficiently low viscosity to enable the composition to be applied to the frozen mercury pattern in the form of a stratum or film by dipping the frozen mercury pattern in the slurry although it is within the scope of the present invention to apply the composition in any suitable way, such as by pouring, brushing, pumping or spraying on the frozen mercury pattern.

A suitable liquid carrier is one which is liquid when applied to the frozen mercury pattern substantially below its freezing temperatures, such as −60° C. and has a boiling point below normal atmospheric temperatures, such as 15° to 25° C. at atmospheric pressure, and particularly an organic liquid which has a boiling point between about −40° and 0° C. at atmospheric pressure. Suitable liquid carriers are aliphatic chloro-fluoro compounds such as liquefied monochlorodifluoromethane (Freon 22) or dichlorodifluoromethane (Freon 12), liquefied methyl chloride or mixtures of two or more of these liquid carriers are satisfactory.

Liquefied monochlorodifluoromethane has proven especially suitable as a carrier for use in coating compositions which are to be applied to casting patterns of pure frozen mercury because it is a gas at normal temperature, is in the liquid state at the temperature of the frozen mercury pattern, it has a high vapor pressure and volatilizes in a short period of time at temperatures below −40° C. The liquid carrier should be present in a sufficient amount as to enable it to hold suspended or dispersed or in colloidal solution the organic resinous binder particles, and, if stirred or agitated, to hold suspended or dispersed the refractory particles and raised temperature binder particles. A sufficient amount of the liquid carrier should be present to provide, together with the solid composition ingredients, a slurry of the desired viscosity, variable in accordance with the intricacies of the pattern, so that it shall readily penetrate all narrow pattern crevices. For coating intricate frozen mercury patterns, the viscosity of the slurry for preparing the inner shell layer should be about 100 to 150 centipoises at −60° C. so that the slurry when applied will penetrate into indentations and small or narrow openings and will form a thin film or stratum on thin closely spaced fins or the like. For less intricate patterns, the viscosity of the slurry may be higher, up to about 250 centipoises at −60° C. The slurry for the outer backing shell layer may have a still higher viscosity, such as from 400 to 1600 centipoises at −60° C.

The raised temperature binder for the refractory particles is so chosen as to become effective as a binder for the refractory particles at or about normal temperatures and which, after becoming effective, binds the refractory particles together at the casting temperature of substantially all metals and alloys, such as metals or alloys having a fusion point of approximately 1800° C. or higher, as well as at low and intermediate temperatures. Inorganic binders which become effective at temperatures ranging from 350° to 1250° have proven especially suitable. Various compounds or mixtures of compounds have proven suitable as raised temperature binder for shell-forming coating compositions of the invention.

Strong thin porous shell molds of the type described above may be formed over frozen mercury patterns by combining the refractory particles with raised temperature binders which consist wholly or partly of a metal borate or of compounds which react to form a metal borate. Because they become effective as a binder for the refractory particle material at lower temperatures, the alkali metal borates (including metal tetraborates) or compounds which react to form such alkali metal borates are specially suitable. Very desirable raised temperature binders for the refractory particles of such thin shell molds are provided by a combination of an alkali metal fluoride with a boron compound, such as boric acid or boric oxide. Suitable alkali metal fluorides are the fluorides of sodium, potassium, lithium, beryllium. Other fluorides of the elements of groups 1a and 2a of the periodic table are also suitable for use as such raised temperature binder ingredients for the refractory particles of such thin shell molds.

When combining an alkali metal fluoride with a boron compound, such as boric acid or boric oxide, to provide a raised temperature binder for the refractory particles of such thin shell molds, the relative proportions of the metal fluoride and the boron compound may vary over a wide range and the amount of the boron compound may range from incidental impurities up to a substantial proportion. In general, the proportions of these ingredients may vary from 99% of the metal fluoride with 1% of the boron compound to about 33% of the alkali metal fluoride with about 67% of the boron compound. It is good practice to combine the alkali metal fluoride with 5% to 35% of boric acid or similar boron compounds for use as a raised temperature binder for the refractory particles of such thin shell molds.

As an example, in commercial practice, highly satisfactory strong thin shell molds are obtained by combining the refractory particles with a raised temperature binder consisting of about 75% of the alkali metal fluoride in the form of sodium fluoride and 25% of boric acid.

The amount of the raised temperature binder which is combined with the refractory particles for forming the thin shell mold may vary over a wide range and particularly from about .25% to 2.0% of the total solid ingredients of the investment composition. Good results are obtained by combining the refractory particles with .25% to 1% of the raised temperature binder consisting of about 75% of the alkali metal fluoride and 25% of boric acid. In general, depending upon the binder chosen, amounts of raised temperature binder varying from about .25% to 5% of the total amount of solids in the coating composition (after the carrier vaporizes) have given satisfactory results. In compositions for preparing both the inner shell layer and also the outer shell layer, good results are obtained with the amount of the raised temperature binder forming .5% to 5% and even somewhat higher up to 7% of the solids in the composition (after the carrier evaporates).

The coating composition for producing the outer backing shell layer of a shell mold composed of two or more shell layers, such as backing shell layer 29 (Fig. 4) or backing shell layer 38 (Fig. 8) may be formed of essentially the same ingredients as utilized to form the inner shell layer. However, the refractory particles of the coating composition for the backing-shell layer are chosen to be partly of coarse particles. As the coarse refractory particles, any suitable refractory particle material capable of resisting high temperatures may be used. The coarse refractory particles may consist of the materials as described above for forming the inner shell layer, including zirconium silicate, zirconium oxide, or beryllium, magnesium or silicon oxide. Also refractory materials such as prefired firebrick particles, prefired silica sand, micaceous material such as vermiculite, an aluminum silicate, such as sillimanite or mullite, or a mixture of two or more of such refractory particle materials. The size of the coarse particles may vary over a wide range, and may have, for instance, an average particle size of −12 mesh to +60 mesh. Good results are obtained with backing-layer slurry compositions wherein the proportion of the fine refractory particles to the coarse refractory particles vary over the range between about 3 to 2 and 1 to 1. Depending on the character and the shape of the article to be cast and the size thereof, the proportion of the fine to the coarse particles may be varied over the range between 3 to 2 and 2 to 3.

Shell molds of the invention also may be made with other types of investment compositions consisting of similar ingredients but embodying as a raised temperature binder primary or secondary or tertiary ammonium phosphates, $NH_4H_2PO_4$, $(NH_4)_2HPO_4$ and $(NH_4)_3PO_4$, in small particle size, such as of −150 to −135 mesh particle size, or a mixture of an alkali metal and an ammonium phosphate, such as microcosmic salt, or a mixture of one or more of the foregoing compounds with binder ingredients which consists of an alkali metal fluoride together with a boron compound, such as boric acid or boric oxide, or alkali metal borates, or alkali metal fluorides only.

In compositions for preparing both the inner shell layer and also the outer shell layer, the amount of the ammonium phosphate raised temperature binder may be .5% to 5% and up to 7% or 10% of the solids of the composition (after the carrier evaporates). It is good practice to use about 2% to 4% of the ammonium phosphate binder. In commercial practice, good results are obtained with about 3.5% of the ammonium phosphate as a raised temperature binder for the refractory particles of shell molds of the type shown in Figs. 2 to 9.

When shell mold material of the invention containing refractory particles combined with fine particles of a small binder addition consisting of ammonium phosphate is heated or baked at 450° C. and higher, the ammonium phosphate content reacts with the refractory particles and causes them to become bound into a hard shell mold. It is believed that when the binder particles of ammonium phosphate are heated to 450° C. and higher they decompose into phosphoric acid which reacts with the refractory particles and brings about the binding of the refractory particles into hard shell mold material.

When an alkali metal fluoride, an alkali metal boron compound, or mixtures thereof, or compounds which react at intermediately high temperatures to form such compounds or mixtures, are present as the raised-temperature binder for the refractory particles, the binder does not become effective at as low a temperature as the phosphoric acid which is formed by the decomposition of ammonium phosphate particles and consequently, when such binders are utilized in both the inner and outer coating layers, the shell mold which is formed has the tendency to sag a slight amount when heated to a high temperature. This is due to the fact that a considerable portion of the low-temperature binder volatilizes, or decomposes and volatilizes, or is otherwise modified before the alkali metal fluoride, the alkali metal borate, or the alkali metal tetraborate, which is present or which is formed by the reaction of an alkali metal fluoride and boric acid or boric oxide, becomes effective as a binder for the refractory material. In the outer supporting layer, however, the phosphoric acid is finally formed by the decomposition of the ammonium phosphate under the influence of heat, reacts with the refractory particles and becomes effective as a binder for the refractory particles at lower temperatures than an alkali metal fluoride or alkali metal boron compounds. A shell mold having an inner layer formed of refractory particles bound together by the reaction product of an alkali metal fluoride and the refractory material, an alkali metal boron compound, or the combination of an alkali metal boron compound and the reaction product of an alkali metal fluoride and the refractory material, and an outer supporting layer in which the refractory particles are bound together by the reaction product of a phosphoric acid and the refractory material, will therefore have an inner surface of the desired hardness and the shell mold will retain its shape during the firing operation.

Below are specific examples of shell-forming coating compositions suitable for preparing the inner shell layer of thin shell molds of the invention of the type shown in Figs. 2 to 11.

*Example 1*

| | Grams |
|---|---|
| Liquefied monochlorodifluoromethane (Freon 22) | 10,500.0 |
| Polymerized vinyl acetate having a viscosity of 700 to 900 centipoises at 20° C. with molar solution in benzene | 141.8 |
| Ethyl cellulose that has been ethylated to an extent of 46.5% to 48.5% and having a viscosity of 20 centipoises when a 5% solution thereof is dissolved in a mixture of 80% toluene and 20% ethanol | 47.3 |
| Phenol-formaldehyde condensation product condensed to its intermediate soluble stage | 94.5 |
| Boric acid | 46.2 |
| Sodium fluoride | 140.7 |
| Zirconium silicate, −325 mesh particle size | 18,425.5 |

*Example 2*

| | Grams |
|---|---|
| Liquefied monochlorodifluoromethane (Freon 22) | 21,000.0 |
| Polymerized vinyl acetate having a viscosity of 700 to 900 centipoises at 20° C. with molar solution in benzene | 284.0 |
| Ethyl cellulose that has been ethylated to an extent of 46.5% to 48.5% and having a viscosity of 20 centipoises when a 5% solution thereof is dissolved in a mixture of 80% toluene and 20% ethanol | 94.0 |
| Phenol-formaldehyde condensation product condensed to its intermediate soluble stage | 189.0 |
| Primary ammonium phosphate, −325 mesh particle size | 1,325.0 |
| Zirconium silicate, −325 mesh particle size | 35,925.0 |

The composition of Example 2 is suitable for forming the outer backing shell layer except that instead of fine refractory particles of −325 mesh particle size, it is formed with a mixture of coarse and fine refractory particles, as described hereinabove.

Other examples of compositions suitable for forming shell molds of the invention are given in U. S. Patent 2,790,218, issued April 30, 1957, on the co-pending application Serial No. 440,056, filed June 29, 1954, by me jointly with Z. Kazenas as a continuation-in-part of our prior applications Serial No. 7,955, filed February 12, 1948, now abandoned, and Ser. No. 113,452, filed August 31, 1949, now abandoned, Serial No. 257,328, filed November 20, 1951, now abandoned, and Ser. No. 304,301, filed August 14, 1952, now abandoned.

In the foregoing specification there are described processes for forming shell molds of the invention over casting patterns of frozen pure mercury. Similar shell molds of the invention of similar desirable characteristics may be also made with solid casting patterns of other metals having desirable properties of the type exhibited by casting patterns of pure frozen mercury.

It will be apparent to all those skilled in the art that the novel principles of the invention disclosed herein in connection with specific exemplifications thereof will suggest various other modifications and applications of the same. It is accordingly desired that in the present invention they shall not be limited to the specific exemplification thereof described herein.

I claim:

1. A destructible shell mold in the form of a thin, porous shell layer having inner core walls and surrounding mold walls spaced therefrom and providing therewith a mold cavity for casting a hollow metal body having thin walls surrounding said core with the metal cast into the mold cavity contracting about said shell core during cooling, the walls of said shell mold being composed essentially of a predominant amount of refractory particles and the innermost stratum of the shell layers of said walls having refractory particles of fine particle size, an inorganic binder for the refractory particles constituting .25% to 7% of said solid ingredients and becoming effective and being sufficient in amount to bind said refractory particles into a self-supporting shell mold when heated to a raised temperature between 300° C. and 1250° C., an organic resinous binder for said refractory particles and said inorganic binder constituting .25% to 7% of said solid ingredients and being effective and being present in amount sufficient to bind said refractory particles and the inorganic binder into a self-supporting shell layer over temperatures from below the freezing temperature of a mercury pattern over which said shell mold has been formed up to temperatures at which said inorganic binder becomes effective in binding the refractory particles, the wall portions of said core around which cast metal contracts when cooling having a thickness at most ¼ inch and being sufficiently thin as to yield under the forces of the contracting cast molten metal solidifying around them but being sufficiently thick to resist the impact of the hot molten metal cast into said mold cavity, at least portions of the walls of the cast metal cast into said cavity and contracting about said core having a thickness which is at most of the order of a quarter of an inch.

2. A shell mold as claimed in claim 1, the core wall portions around which cast metal contracts being at most about ⅛ inch thick, said mold having an inner shell layer formed with fine refractory particles, and an outer shell layer formed with a mixture of fine refractory particles and coarse refractory particles.

References Cited in the file of this patent

UNITED STATES PATENTS

| | | |
|---|---|---|
| 2,433,168 | Staeger | Dec. 23, 1947 |
| 2,441,695 | Feagin et al. | May 18, 1948 |
| 2,449,136 | Pattison | Sept. 14, 1948 |
| 2,521,614 | Valyi | Sept. 5, 1950 |

FOREIGN PATENTS

| | | |
|---|---|---|
| 585,665 | Great Britain | Feb. 18, 1947 |